Figure 1:

Nov. 12, 1957  R. H. PRINDLE  2,812,610
FRAY GUARD FOR FISH HOOK LEADERS
Filed March 11, 1955

INVENTOR.
ROBERT H. PRINDLE,
BY
ATTORNEY

United States Patent Office 2,812,610
Patented Nov. 12, 1957

2,812,610

FRAY GUARD FOR FISH HOOK LEADERS

Robert H. Prindle, Palmetto, Fla.

Application March 11, 1955, Serial No. 493,671

1 Claim. (Cl. 43—44.83)

This invention relates to a fray guard for the usual and well known gut fishing line leaders, and has particular reference to a novel flexible armor that is disposed over the gut leader as a means to successfully prevent injury to the gut by the teeth of a fish striking the supported hook.

The invention contemplates a protective armour that is engaged over the gut leader of the hook for the major length of the leader and that is secured at its lower end to the hook in a manner to prevent displacement thereof and with the armor being both flexible and compressible.

The invention further contemplates a metallic armor for gut leaders that is wound from a preferably stainless steel wire for forming a tubular sheath that is slidable over the gut leader to be anchored to the eye of the hook, which will protect the gut leader against the fraying action or the biting off of the leader by the teeth of fish, and that is flexible and compressible to the extent that it does not interfere with the freedom of movement of the leader and it is compressible to the extent that a fish biting over the hook and upon the leader, the teeth of the fish will engage the armor causing the armor to slide and be compressed and fully protect the gut against the injurious stripping and fraying action of the teeth. The device readily adapts itself to varying sizes of leaders.

Details of construction and operation of the device will be more clearly apparent during the course of the following description, reference being had to the accompanying drawings wherein has been illustrated a preferred embodiment of the device and wherein like characters of reference are employed to denote like parts throughout the several figures.

Figure 2:
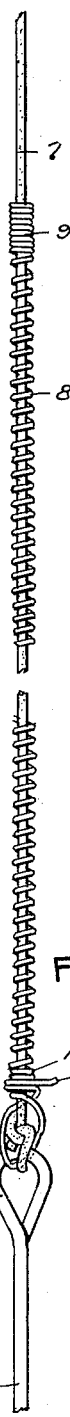
Figure 3:
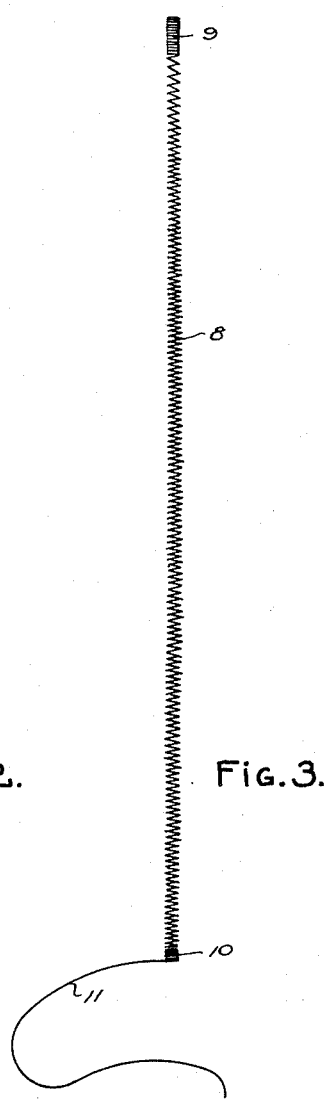

In the drawings:

Figure 1 is a side elevation of a fish hook and its associated gut leader showing the invention applied thereto, Figure 2 is a greatly enlarged side elevation of the device of Figure 1 and at a right angle thereto, and Figure 3 is a fragmentary side elevation of the device prior to its installation over the gut leader.

Referring specifically to the drawings, the numeral 5 designates a conventional fishing hook having an eye 6 carried by the usual shank of the hook. Connected with the eye 6 is a conventional gut leader 7. It will be apparent that the hook and the leader are of conventional construction and are formed in different sizes and lengths. The invention, however, is concerned primarily with the protection of a substantial length of the leader from the hook 5 that would be likely to be injured by a fish striking at a bait supported upon the hook. Disposed over the leader 7 for its major length is a protective metallic armor, indicated as a whole by the numeral 8. The armor 8 is similar to an elongated coil spring having an open diameter capable of freely sliding engagement over the leader 7. The armor 8 is preferably wound from a proper gauge stainless steel wire that is tempered to impart adequate spring tension to the device. The upper end of the armor is preferably in the form of a closely packed coil 9, while the lower end is also preferably provided with a close packed coil 10 having an elongated free end 11, for a purpose to be presently described. The armor is freely flexible laterally and compressible longitudinally.

In the assembly of the device and prior to the forming of an upper loop 12 upon the leader 7, the leader 7 is first securely tied to the eye 6. The armor 8 is then slipped over the leader 7 to a point where the lower close packed coil 10 engages the leader tie, after which the free end 11 is trained through the eye 6 of the hook and then twisted about the lower close packed coil 10, securely anchoring the armor against upward shifting movement upon the leader which condition, if possible, would destroy the effectiveness of the device. The armor 8 is freely slidably over the leader and offers no resistance to the freely flexing action of the leader during the use of the device. When a fish, such as a game fish, strikes at the bait supported upon the hook, its jaws usually pass over the hook and engage the leader. Such action heretofore has caused the leader to become frayed and weak, and due to such fraying frequently results in the leader being broken at the weakened point with the resulted loss of the fish. Normally, the fishermen, when first observing a frayed leader, will replace the leader and its supported hook. With the device of this invention, when the fish strikes to the point where its teeth engage upon the leader, its teeth obviously will grip upon the armor and, as tension is placed upon the line, the leader and the armor will slide through the teeth of the fish, causing the armor to be compressed to the point where the teeth of the fish will slide therefrom to permit the hook to become impaled in the mouth of the fish. The leader is therefore fully protected at all times against the direct engagement of the teeth of the fish thereon, thus imparting to the leader a relatively long life free from fraying or breaking. It is a well known fact that certain game fish have teeth that are capable of biting the leader in half and the armor of this invention fully protects the leader in such cases. Further, the armor is made of sufficient length as to protect the leader for its major length against fraying by dragging over sharp rocks and the like in use, and any tendency for the leader to become wedged upon sharp rocks is avoided by the compressible sliding action of the armor.

It should be understood that while the device has been illustrated and described as used in conjunction with the well known gut leader, it will be clearly apparent that the device is applicable to any frayable fishing line leaders. Such leaders include the composition line, such as monofiliment, nylon, textile lines of linen, cotton or the like and the invention is in no sense restricted in its use.

It will be apparent from the foregoing that a very novel and highly effective protective means has been provided for the usual and well known gut leaders. The device is strong, durable, cheap to manufacture and imparts a relatively long life to the leader. As before pointed out, the armor is formed in different diameters in accordance with the particular diameters of the leaders upon which it is used. The device is easily applied and does not add any bulky structure to the leader that would interfere with its normal action.

It is to be understood that the invention is not limited to any particular length of armor or to the spacing of the coils thereof and that changes are contemplated as readily fall within the spirit of the invention as determined by the scope of the subjoined claim.

Having described my invention, what I claim as new and desire to secure by Letters Patent is:

A fray guard for flexible fishing line leaders that are connected with a fish hook that comprises an elongated coil of stainless steel wire and with the coil being formed with a diameter of such a size that renders it capable of easy sliding engagement over the leader to the point of attachment of the leader with an eye of the hook, the guard having a length that encases the leader for its major length, the coil at its upper and lower ends being closely wound and with the lower close wound end having an elongated extension for forming an elongated and flexible tie whereby the tie may be laced through the eye of the hook and then wrapped around the lower closely wound coil for securely anchoring the guard to the hook eye against shifting away from the hook.

References Cited in the file of this patent

UNITED STATES PATENTS

| 396,246 | Vom Hofe | Jan. 15, 1889 |
| 1,762,970 | Fielder | June 10, 1930 |
| 2,060,499 | Heidrich | Nov. 10, 1936 |
| 2,108,598 | Burr | Feb. 15, 1938 |

FOREIGN PATENTS

| 988,826 | France | Aug. 31, 1951 |